US012190566B1

(12) United States Patent
Aggarwal et al.

(10) Patent No.: US 12,190,566 B1
(45) Date of Patent: Jan. 7, 2025

(54) SYSTEM FOR GENERATING ENHANCED TRAINING DATA

(71) Applicant: AMAZON TECHNOLOGIES, INC., Seattle, WA (US)

(72) Inventors: Lavisha Aggarwal, Seattle, WA (US); Manoj Aggarwal, Seattle, WA (US); Gerard Guy Medioni, Los Angeles, CA (US); Dilip Kumar, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 289 days.

(21) Appl. No.: 17/652,828

(22) Filed: Feb. 28, 2022

(51) Int. Cl.
*G06V 10/24* (2022.01)
*G06V 10/77* (2022.01)
*G06V 10/774* (2022.01)
*G06V 10/80* (2022.01)
*G06V 40/12* (2022.01)

(52) U.S. Cl.
CPC ........... *G06V 10/774* (2022.01); *G06V 10/24* (2022.01); *G06V 10/7715* (2022.01); *G06V 10/806* (2022.01); *G06V 40/12* (2022.01)

(58) Field of Classification Search
CPC ............... G06V 10/774; G06V 10/24; G06V 10/7715; G06V 10/806; G06V 40/12
See application file for complete search history.

(56) References Cited

U.S. PATENT DOCUMENTS

| | | | |
|---|---|---|---|
| 10,902,237 B1 * | 1/2021 | Aggarwal | G06V 40/1365 |
| 2008/0144962 A1 * | 6/2008 | Jung | G06T 5/90 |
| | | | 382/274 |
| 2018/0189951 A1 * | 7/2018 | Liston | G06T 7/194 |
| 2020/0074234 A1 * | 3/2020 | Tong | G06F 18/2148 |
| 2020/0170383 A1 * | 6/2020 | Martin | G06V 40/169 |

OTHER PUBLICATIONS

"04-Composition", Princeton University, 16 pages. Retrieved from the Internet: URL: https://www.cs.princeton.edu/courses/archive/fall10/cos526/lectures/04-composition.
"Alpha Compositing", Wikipedia, 6 pages. Retrieved from the Internet on Jan. 17, 2022. URL: https://en.wikipedia.org/wiki/Alpha_compositing.

(Continued)

*Primary Examiner* — Huo Long Chen
(74) *Attorney, Agent, or Firm* — Lindauer Law, PLLC

(57) ABSTRACT

Enhanced training data representative of possible inputs is used to train a machine learning system. For example, a machine learning system to determine identity based on an image of a human palm may be trained using enhanced training data comprising images. The enhanced training data may comprise source images that have been modified to appear to depict synthetic artifacts that attempt to simulate human palms, augmented images of dirty hands, and so forth. A synthetic artifact image may be produced by selectively removing some data from a source image. An augmented image may be produced by selectively blending the source image with features extracted from sample images. These images may then be used as training data to train the machine learning system.

20 Claims, 6 Drawing Sheets

(56) References Cited

OTHER PUBLICATIONS

"Image pyramids and their applications", Alumni Media MIT, Feb. 26, 2008, 20 pages. Retrieved from the Internet: URL: alumni.media.mit.edu/~maov/classes/vision08/lect/08_applicsPyramids_combination.pdf.

"Pyramid (image processing)", Wikipédia, 5 pages. Retrieved from the Internet on Nov. 27, 2021. URL: https://en.wikipedia.org/wiki/Pyramid_%28image_processing%29.

Ataky, et al., "Data Augmentation for Histopathological Images Based on Gaussian-Laplacian Pyramid Blending", Jan. 2020, 9 pgs. Retrieved from the Internet: URL: https://www.researchgate.net/publication/339015993_Data_Augmentation_for_Histopathological_Images_Based_on_Gaussian-Laplacian_Pyramid_Blending.

Eddins, Steve, "Multiresolution pyramids part 3: Laplacian pyramids", Apr. 16, 2019, 7 pgs. Retrieved from the Internet: URL: https://blogs.mathworks.com/steve/2019/04/16/multiresolution-pyramids-part-3-laplacian-pyramids/.

He, et al., "Synthesizing Depth Hand Images with GANs and Style Transfer for Hand Pose Estimation", School of Automation, China University of Geosciences, Jul. 1, 2019, 19 pgs. Retrieved from the Internet: URL: https://pdfs.semanticscholar.org/c142/0fe78843968964820d35fae2a5341d127a8d.pdf.

Lin, et al., "Drafting and Revision: Laplacian Pyramid Network for Fast High-Quality Artistic Style Transfer", Xidian University. Chongqing Universtiy of Posts and Telecommunications. Department of Computer Vision Technology (VIS), Baidu, Inc. 24 pgs. Retrieved from the Internet: URL: https://www.arxiv-vanity.com/papers/2104.05376/.

Yun, et al., "CutMix: Regularization Strategy to Train Strong Classifiers with Localizable Features", Aug. 7, 2019, 6 pgs. Retrieved from the Internet: URL: https://arxiv.org/abs/1905.04899v2.

Zeng, et al., "Image Fusion Using Laplacian Pyramid Tramsform", ECE Capstone Design Project, Spring, 2014, 27 pgs. Retrieved from the Internet: URL: https://www.ece.rutgers.edu/sites/default/files/uploads/Image-Fusion-capstone_report.pdf.

Zhang, et al., "Deep Image Compositing", Nov. 4, 2020, 5 pgs. Retrieved from the Internet: URL: https://arxiv.org/abs/2011.02146.

* cited by examiner

SYSTEM FOR GENERATING ENHANCED TRAINING DATA

BACKGROUND

Performance of a machine learning system is improved by using a large set of input data for purposes such as training or evaluation.

BRIEF DESCRIPTION OF FIGURES

The detailed description is set forth with reference to the accompanying figures. The use of the same reference numbers in different figures indicates similar or identical items or features. The figures are not necessarily drawn to scale, and in some figures, the proportions or other aspects may be exaggerated to facilitate comprehension of particular aspects.

Figure 1:
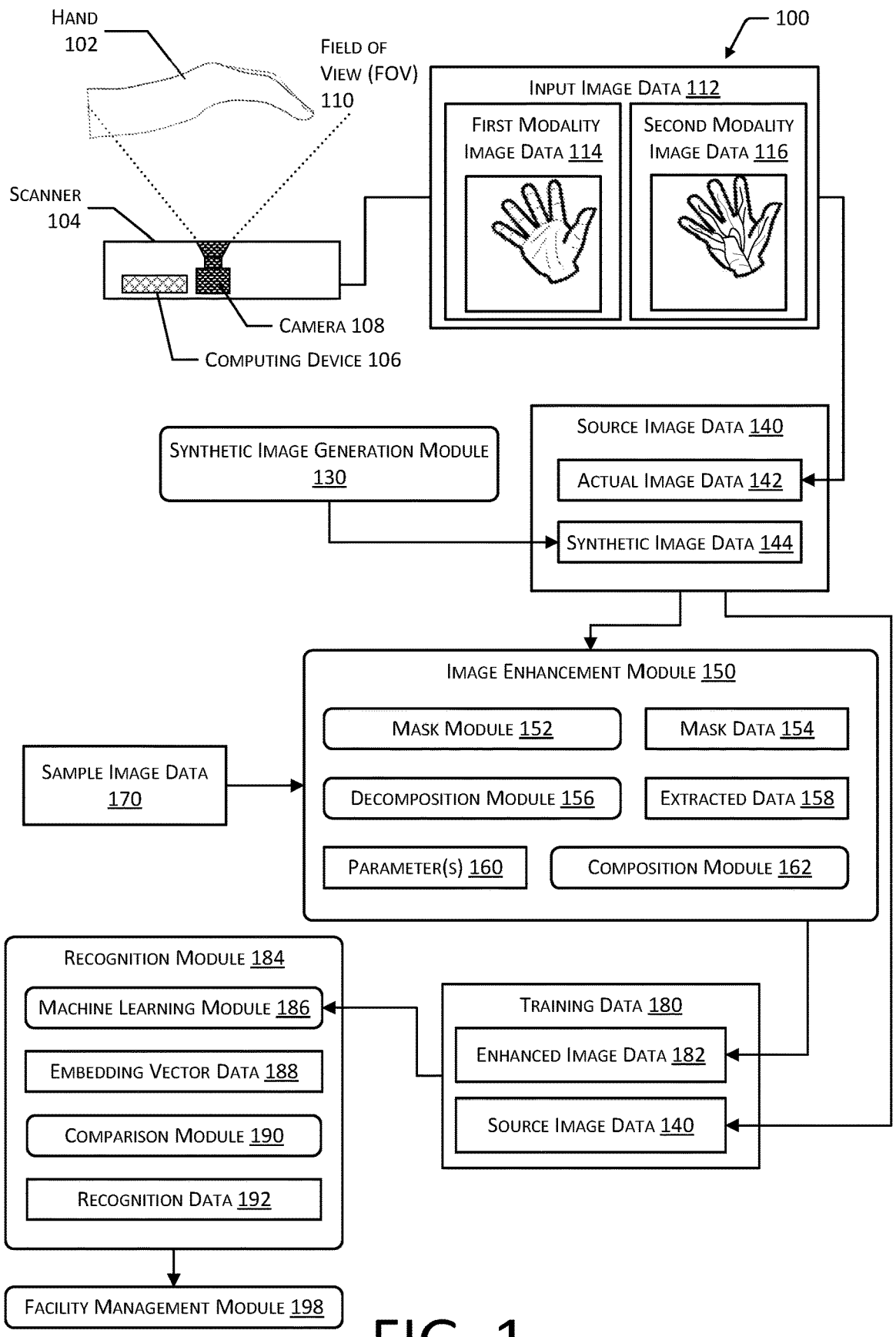
FIG. 1 illustrates a system to provide enhanced training data to a first machine learning system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. As the user enters the facility, they may be identified using the devices and techniques described herein.

Traditional systems for identifying users suffer from several significant drawbacks including susceptibility to fraud, slow speed, inaccuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred.

Biometric identification systems that use machine learning systems, such as artificial neural networks, may be trained or evaluated using input data. For example, a system that is trained to recognize features in an image of a human palm may be trained using images of actual human palms. Continuing the example, once trained, the system may be evaluated. Training of machine learning systems may require large sets of unique data. In many situations, the larger the set of training data used to train the system, the greater the accuracy of the results produced by the trained machine learning system.

To improve the resulting performance of the trained machine learning system, the training data would include representations of input that are expected to occur. For example, training data comprising images of hands would contain images of artifacts, such as replicas that may be presented in an attempt to gain unauthorized access. In another example, training data comprising images of hands would contain images of clean hands, dirty hands, abrasions, callouses, and so forth.

A set of training data used to train or evaluate a machine learning system may include millions of entries, such as images of different human palms. However, it may be infeasible to acquire such a large set of training data with the possible variations. For example, the cost to fabricate and acquire images of millions of different artifacts or dirty hands from different people may be prohibitive. Previously acquired sets of images acquired for different purposes may be unusable due to inadequate data. For example, previously acquired image data may be of actual hands that are clean. As a result, this previously acquired image data may be inadequate to train a system that attempts to recognize users based on multimodal data that includes surface features and sub-surface features such as veins or other anatomical features while also contending with replicas and variable hand conditions, such as dirt or grease on a palm. As a result of these real-world possibilities, enhanced training data may provide images that appear to depict replicas, dirty hands, and so forth.

Described in this disclosure are techniques for processing input data, such as previously acquired actual or synthesized images of hands, and generating enhanced images for use as training data. In one implementation, input data may be processed to generate enhanced data comprising synthetic artifact image data that appears to depict an artifact. In another implementation, the input data may be processed to generate enhanced data comprising augmented image data that appears to depict a hand with added features such as dirt, abrasions, grease, and so forth.

Source data, such as input image data, is decomposed to determine extracted data. In some implementations, a Laplacian pyramid may be used to perform the decomposition. The extracted data may comprise information about a particular layer or level of the Laplacian pyramid. Each layer of the Laplacian pyramid corresponds to features in the source data within a respective frequency band. For example, a level of the Laplacian pyramid that corresponds to low frequencies may be representative of an overall shape of a hand in the image. In another example, a level of the Laplacian pyramid that corresponds to high frequencies may be representative of creases, veins, and other smaller features. While some features depicted in the input may be represented completely within a single level, other features may be associated with information in two or more levels.

Parameters are determined that specify weights for each level. For example, if the Laplacian pyramid used to decompose the input image data has five levels, the parameters may comprise five values. Modified data is determined by multiplying the extracted data by the respective value specified by the parameters. By changing the values of the parameters, the appearance of features represented by corresponding extracted data may be preserved or removed.

The parameters may be configured to remove information. For example, the extracted data corresponding to higher frequency ranges may be de-emphasized by having respective parameters with values less than one. The resulting modified data may then include fewer or no higher frequency features, providing a synthetic artifact image that appears to be an artifact, such as a replica of a hand.

In some implementations, a mask may be used to segregate the portions of the source image that appear to depict a foreground and a background. This facilitates blending the background of the source image with the foreground data that is based on the modified data. This blending allows for the preservation of background data while showing the foreground data. In some implementations, random noise may be added to the modified data or an image derived therefrom.

The techniques described in this disclosure may be used to transfer features from one image to another. A source image is processed as above to determine a first set of extracted data. Sample images are acquired that depict dirty hands, hands with abrasions, or other features of interest. The sample images are processed to determine a second set of extracted data. Some of the second set of extracted data is representative of these features of interest. A subset of the second set of extracted data may then be combined with the first set of extracted data to produce modified data. The modified data depicts the source image and the features of interest, providing an augmented image. For example, if the source image depicts a clean hand of Able, and the sample image depicts a dirty hand of Baker, the modified data depicts a dirty hand of Able.

Parameters indicative of values associated with the extracted data may be used to control the combination of the source image and the features from the sample image. Masks may be used as described above to retain a background while providing modified data of an object of interest in a foreground.

By using these techniques, it is possible to rapidly and efficiency provide a large set of enhanced images that may be used to train a machine learning system. Because the training data includes enhanced images that are more consistent with real-world operation, such as replicas, dirt, and so forth, a substantial increase in accuracy of the trained machine learning system is realized. For example, because the training data includes enhanced images of hands that appear to be dirty, the machine learning system learns to process input data that includes dirty hands.

Illustrative System

FIG. 1 illustrates a system 100 to provide enhanced training data to a first machine learning system, according to some implementations. A hand 102 of a user is depicted positioned above a scanner 104. The scanner 104 may include a computing device 106 and a camera 108. The camera 108 has a field of view (FOV) 110. During operation of the scanner 104, the camera 108 acquires images of an object in the FOV 110, such as the hand 102, and provides input image data 112 obtained using two or more modalities.

The scanner 104 may include other components which are not shown. For example, the scanner 104 may include lights that illuminate the object in the FOV 110.

In the implementation depicted, the hand 102 is held above the camera 108, with the FOV 110 extending upward. For example, during operation the user may present their hand 102 with the palm or volar region of the hand toward the scanner 104. As a result, the input image data 112 provides an image of the anterior portion of the hand 102. In other implementations, the input image data 112 may include the back of the hand 102. Other configurations to acquire input image data 112 may also be used. For example, the camera 108 may have the FOV 110 extending downwards, and the user may place their hand 102 in the FOV 110 under the scanner 104.

The scanner 104 is configured to acquire multimodal images of the hand 102. A first modality may acquire images in which the hand 102 is illuminated with light having a first polarization and obtained by the camera 108 with a polarizer passing light to the camera 108 that also has the first polarization. First modality features may comprise features that are close to, or on, a surface of the hand 102 of the user. For example, the first modality features may include creases, wrinkles, scars, dermal papillae ridges, and so forth in at least the epidermis of the hand 102.

Second modality features comprise those features that are below the epidermis. The second modality may acquire images in which the hand 102 is illuminated with light having a second polarization and obtained by the camera 108 with the polarizer passing light to the camera 108 with the first polarization. For example, the second modality features may include anatomical structures such as veins, bones, soft tissue, or other sub-surface features. Some features may be visible in both first modality and second modality images. For example, a crease in the palm may include first modality features on the surface as well as deeper second modality features within the palm.

Separate images of the first and second modalities may be acquired using different combinations of polarized light provided by infrared lights. In this illustration, the input image data 112 comprises first modality image data 114 and second modality image data 116. The first modality image data 114 and the second modality image data 116 of the same image may be acquired in rapid succession with respect to one another. For example, the camera 108 may operate at 60 frames per second and acquire the first modality image data 114 in a first frame and the second modality image data 116 in a second frame.

In the implementation depicted here, the scanner 104 does not include a guide, scan plate, or other structure that constrains the pose or position of the hand 102. In another implementation, the scanner 104 may include a structure such as a guide or scan plate to constrain at least some movement of the hand 102. For example, the scan plate may comprise a flat pane of glass which the hand 102 may rest upon, and the camera 108 may then acquire an image.

Traditionally, training data used to train a machine learning system to recognize features is unique and extensive. For example, to recognize a particular hand as depicted in input image data 112, the machine learning system would be trained using training data comprising images of a set of thousands of unique hands. A hand may be considered unique if the features of that hand differ sufficiently from other previously known hands. For example, the features of a hand may be expressed as vector values. The vector values for a particular hand describe a particular location in a vector space. If a first location in vector space for a first hand is greater than a minimum distance away from a second location in the vector space of a second hand, the two may be deemed to be unique with respect to one another. If the first location in the vector space for the first hand is less than a specified distance away from the second location in vector space, the second hand and the first hand may be deemed to be the same.

Training data used to train a machine learning system may include actual image data 142. The actual image data 142 of one or more modalities comprises images of hands, such as from users who have opted to provide those images, and is expensive to collect and maintain. In some implementations, a synthetic image generation module 130 may be used to generate synthetic image data 144. For example, a generative adversarial network (GAN) may be used to generate synthetic image data 144 in one or more modalities. However, acquiring training data for hundreds of thousands or millions of samples may be infeasible. For example, such acquisition of actual image data 142, generation of synthetic image data 144, or both may be too costly, take too much time, and so forth.

Accuracy and robustness of a machine learning system are improved when the training data includes inputs that may actually be processed by the system. For example, training a machine learning system to recognize the features in human palms using only images of actual human palms that are clean will be less accurate than training the machine learning system using images that include artifacts, dirty palms, and so forth. However, acquiring actual image data 142 and generating synthetic image data 144 that depicts these various conditions may be cost prohibitive. For example, an existing set of training data may consist of clean hands, and omit dirty hands. Continuing this example, traditionally the omission of dirty hands from the training data would be remedied by acquiring additional images of dirty hands.

Described in this disclosure is an image enhancement module 150 that processes source image data 140 and provides as output enhanced image data 182. The source image data 140 may comprise actual image data 142, synthetic image data 144, and so forth.

The enhanced image data 182 provided by the image enhancement module 150 may comprise one or more of synthetic artifact image data, augmented image data, and so forth. For example, the synthetic artifact image data may appear to depict an artifact such as a model of a hand. In another example, the augmented image data may appear to depict a hand that is dirty.

The image enhancement module 150 may comprise a mask module 152 that determines mask data 154. The mask module 152 may be configured to determine the boundary or contour within which an object of interest is determined to be. For example, the mask module 152 may determine mask data 154 that specifies a boundary or contour of a user's hand 102 as depicted in an image. In some implementations the mask data 154 may comprise a binary mask. The mask module 152 may be used to determine mask data 154 that delineates between background and foreground portions of the image. For example, the hand may be the foreground portion while other depictions may be designated as the background.

A decomposition module 156 may accept data, such as the source image data 140, as input and determine extracted data 158. In some implementations, a Laplacian pyramid may be used by the decomposition module 156 to perform the decomposition and determine the extracted data 158. The extracted data 158 may comprise information about a particular level of the Laplacian pyramid. Each level of the Laplacian pyramid corresponds to features in the input data that have a specific frequency or are at least within a respective range of frequencies, or frequency band. For example, a level of the Laplacian pyramid that corresponds to a range of low frequencies may be representative of an overall shape of a hand in the image. In another example, a level of the Laplacian pyramid that corresponds to high frequencies may be representative of creases, veins, and other smaller features. At least a portion of some features may be associated with information in more than one level. Continuing the example above, while the overall shape of the hand may be represented in the extracted data 158 corresponding to low frequencies, fine spatial resolution details about the edge of the hand may be represented in the extracted data 158 corresponding to the high frequencies.

Different quantities of levels may be used. For example, the decomposition module 156 may use a Laplacian pyramid with five levels and determine five instances of extracted data 158, one for each level. Features may be present or represented across one or more frequency bands. For example, some information about a feature such as the overall shape of the hand may be included in several frequency bands.

Parameters 160 are determined that may specify weights for each level of the extracted data 158. For example, if the Laplacian pyramid used to decompose the input image data 112 has five levels, the parameters 160 may comprise five values.

A composition module 162 may use one or more of the mask data 154, the extracted data 158, or the parameters 160 to determine modified data. The composition module 162 may then provide as output enhanced image data 182 that comprises or is based on the modified data from the composition module 162. A pseudocode example of Laplacian pyramid decomposition is shown below:

```
def generate_pyramids (original_img, num_pyramid_levels):
    #Laplacian and Gaussian Pyramid Decomposition
    blurred_image=original_img.copy( )
    gaussian_pyramid=[blurred_image]
    for i in [0, . . . , num_pyramid_levels):
        blurred_image=Blur_and_Downsample (blurred_image)
        gaussian_pyramid.append(blurred_image)
    laplacian_pyramid=[blurred_image]
    for i in [num_pyramid_levels, . . . , 0):
        lp_layer=gaussian pyramid[i−1]−Upsample_and_Blur (gaussian_pyramid[i])
        laplacian_pyramid.append(lp_layer)
    for i in [0, . . . , num_pyramid_levels/2+1):
        swap_laplacian_pyramid_layer(i, num_pyramid_levels−i)
    return gaussian_pyramid, laplacian_pyramid
```
Code Example 1

Figure 2:
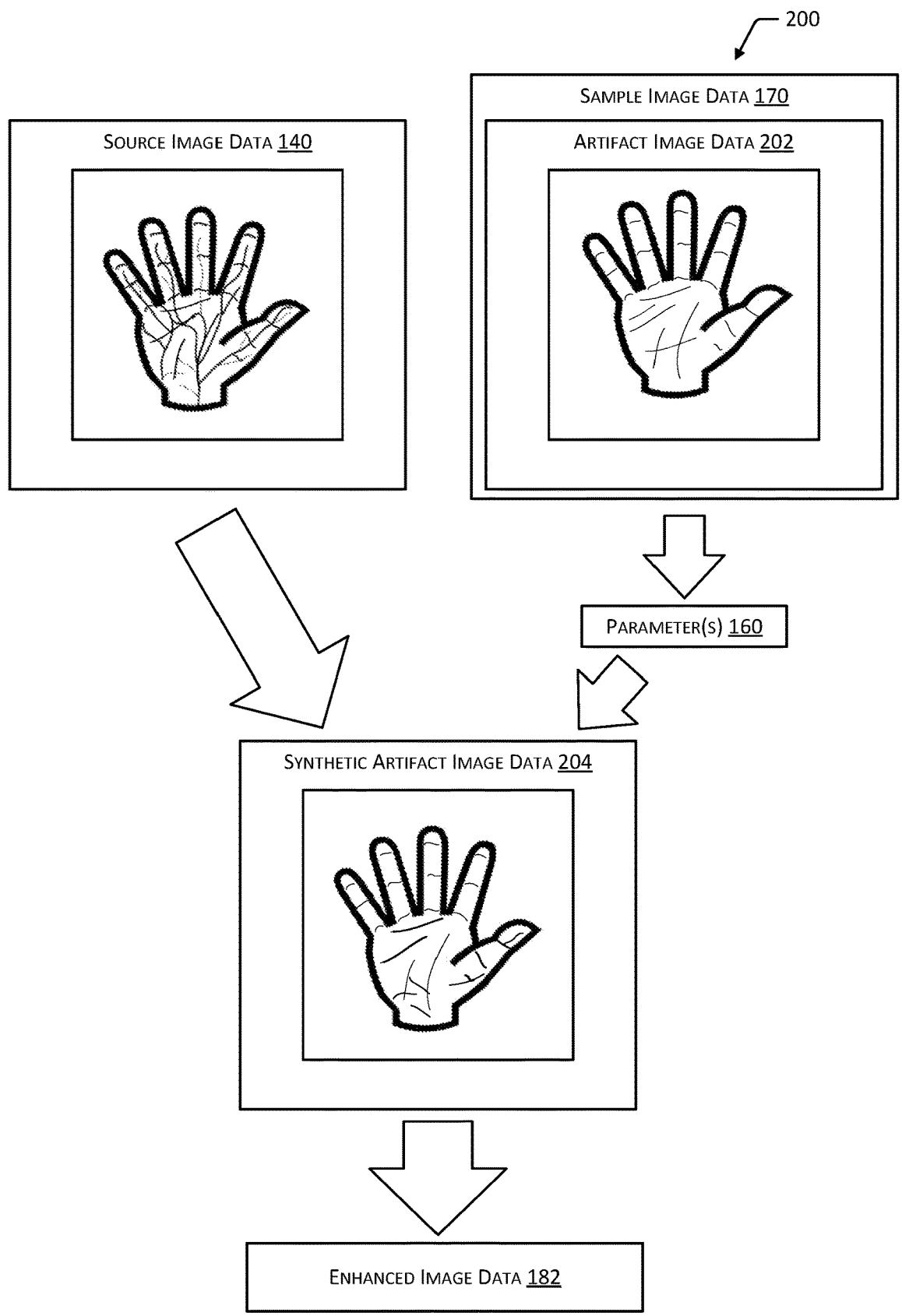
FIG. 2 illustrates determining synthetic artifact image data, according to some implementations.
Figure 3:
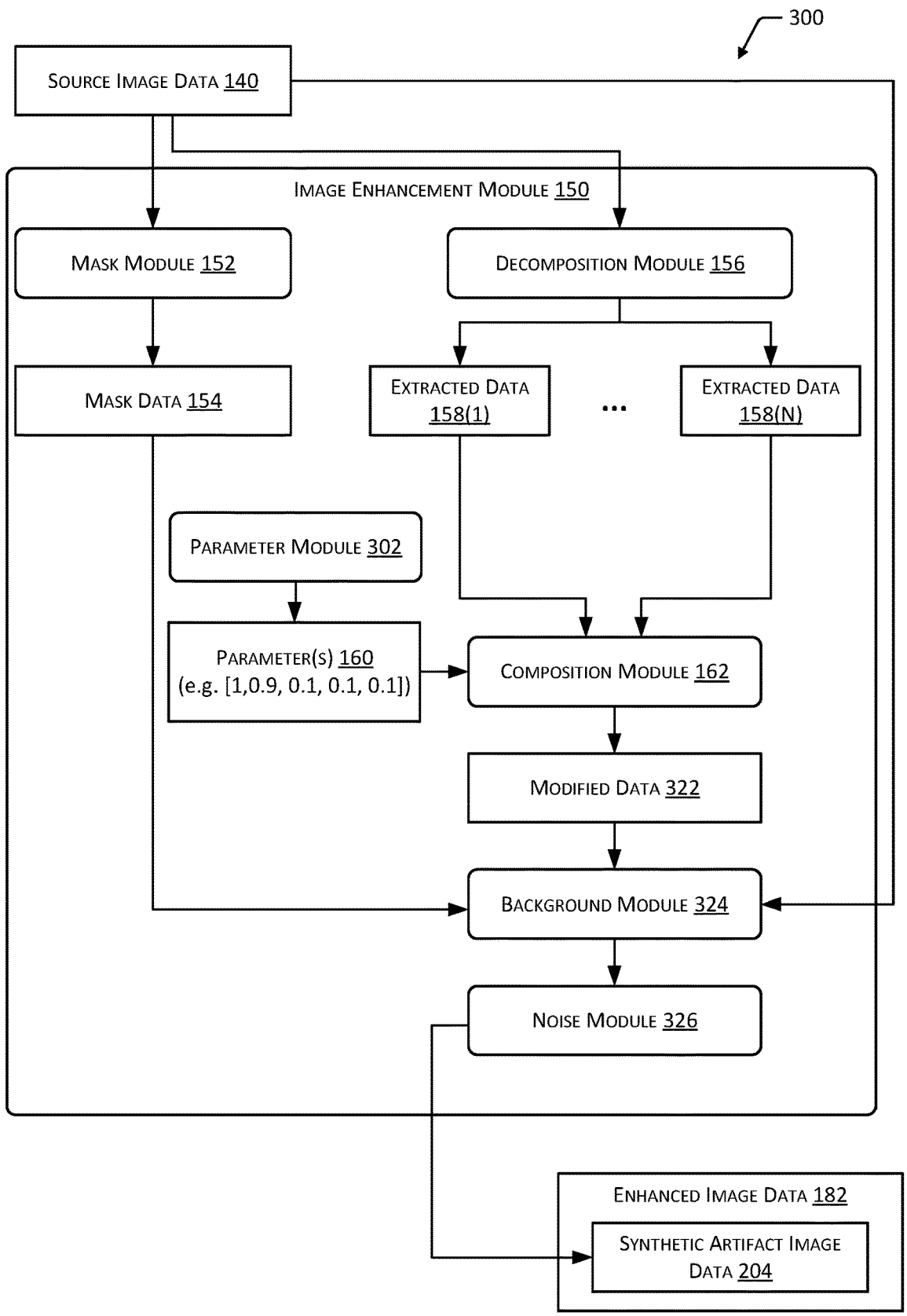
FIG. 3 is a block diagram of determining synthetic artifact image data, according to some implementations.

A first implementation discussed with respect to FIGS. 2-3 uses the image enhancement module 150 to generate enhanced image data 182 such as synthetic artifact image data that appears to depict an artifact such as a fabricated fake hand. This implementation may use parameters 160 with one or more values that downweight particular instances of extracted data 158, producing modified data that omits some information.

Figure 4:
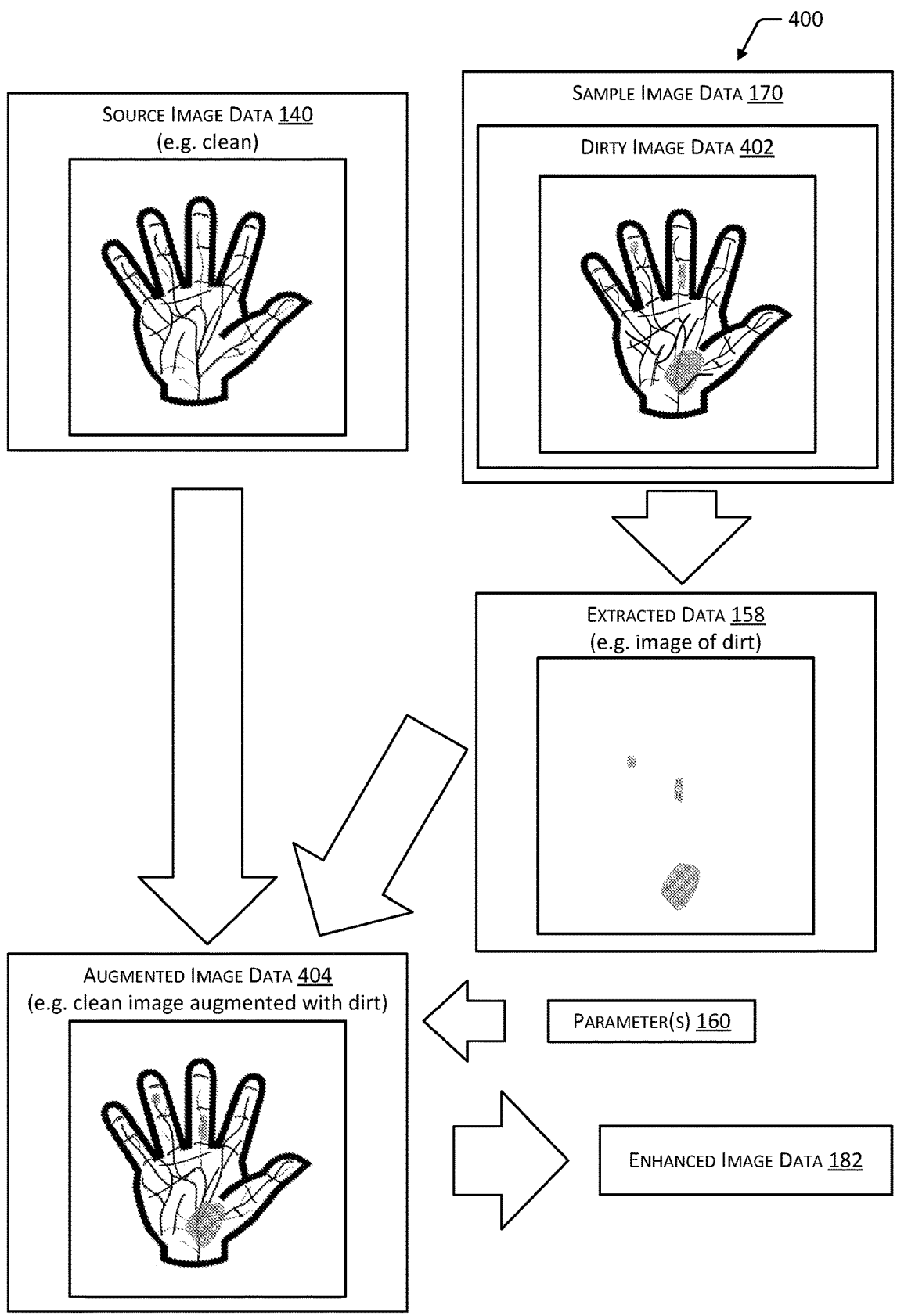
FIG. 4 illustrates determining augmented image data, according to some implementations.

A second implementation discussed with respect to FIGS. 3-4 uses the image enhancement module 150 to generate enhanced image data 182 such as augmented image data that appears to depict a source image with additional features, such as dirt, grease, abrasions, and so forth that have been transferred from sample image data 170. In this implementation, the sample image data 170 is processed to determine second extracted data 158. The parameters 160 are then used to moderate the blending of the first extracted data 158 determined from the source image data 140 and the second extracted data 158 determined from the sample image data 170, producing enhanced image data 182. In some implementations an alpha blending algorithm may be used to perform the blending.

The image enhancement module 150 may include an alignment module (not shown) to align the input images to a specified orientation. For example, the alignment module may align the source image data 140 and the sample image data 170 to appear to depict the hands in the same orientation with respect to the respective images. For example, fingers pointing upwards with respect to the image, and the wrist proximate to the bottom of the image. In other implementations, the source image data 140 and other image data such as the sample image data 170 may be aligned and then be stored.

A recognition module 184 is configured to determine an identity associated with the input provided to it. The recognition module 184 comprises a machine learning module 186, such as a deep learning convolutional neural network. In one implementation, the machine learning module 186 is trained using training data 180 to determine embedding vector data 188. The training data 180 may comprise one or more of the enhanced image data 182 or the source image data 140. The embedding vector data 188 may be considered a set of values that are descriptive of the hand 102 or other object depicted in the input provided to the machine learning module 186. In some implementations, the embedding vector data 188 may act as a signature that is uniquely associated with the identity of the user.

In other implementations, the machine learning module 186 may be trained to determine other information. For example, the machine learning module 186 may be trained to determine quality of an input image, determine if an input image depicts an actual hand or an artifact, and so forth.

Once the machine learning module 186 has been trained, the recognition module 184 may accept as input the input image data 112. The input image data 112 may be processed by the trained machine learning module 186 to determine embedding vector data 188.

A comparison module 190 may compare the embedding vector data 188 from the input image data 112 with previously stored signatures, each signature comprising embedding vector data 188 that is associated with a particular user that is either actual or synthetic. A confidence value may be determined that is indicative of similarity between the embedding vector data 188 and a reference signature that has been previously stored. For example, the confidence value may be determined based on a Euclidean distance in the vector space between the embedding vector data 188 from the input image data 112 and the reference signature. In other implementations, other techniques may be used to compare the input image data 112 or features therein with previously stored data.

Based on the output from the comparison module 190, recognition data 192 is determined. The recognition data 192 may comprise information that is indicative of a likelihood that input image data 112 provided as input to the recognition module 184 corresponds to previously stored embedding vector data 188. The recognition data 192 may comprise a confidence value indicative of likelihood that the identification is accurate and a user identifier. For example, the recognition data 192 may indicate "{confidence}=0.97, {useridentifier}=6c6f6d61i6e2c770a0a".

During an enrollment phase, a user may opt in to present their hand 102. Additional information may be obtained from the user, such as name, contact information, demographic data, payment account information, and so forth. An identity of a particular user may be asserted with the input image data 112, and the embedding vector data 188 associated with that particular user. During subsequent interactions, the user may present their hand 102 at a scanner 104. The resulting input image data 112 may be processed by the recognition module 184 to determine that the input image data 112 corresponds to within a threshold value of previously stored data. For example, if the embedding vector data 188 corresponding to the input image data 112 presented by the user is within a threshold distance in the vector space of a previously stored embedding vector data 188, the identity associated with the previously stored vector may be asserted to the user in the recognition data 192.

The recognition data 192 may provide information such as one or more of a user identifier associated with the user, a location or identification of the scanner 104, data indicative of date and time that the input image data 112 was obtained, and so forth. The recognition data 192 may be subsequently used for various purposes. For example, if the user has been granted access to the facility, a command may be issued to open a gate or door so the user may enter the facility. In another example, the recognition data 192 may be used to determine a payment account or other credentials associated with the user which may then be used in a financial transaction. In yet another example, the recognition data 192 may be passed to a facility management module 198.

The facility management module 198 may use the recognition data 192 to associate an identity with the user as they move about the facility. For example, the facility management module 198 may use data from cameras or other sensors in the environment to determine a location of the user. Given a known path of the user from the gate, the user identity indicated in the recognition data 192 may be associated with the user as they use the facility. For example, the now identified user may walk to a shelf, remove an item, and leave the facility. The facility management module 198 may determine the interaction data indicative of the removal of the item as being associated with the user identifier specified in the recognition data 192, and bill an account associated with the user identifier.

The systems and techniques described above are discussed with respect to images of human hands. These systems and techniques may be used with respect to other forms of data, other kinds of objects, and so forth. For example, audio data may be processed to determine enhanced audio data that provides synthetic audio data that appears to replicate artificial synthesis of a person's voice, augmented audio data that includes coughs, sneezes, background noises, and so forth. In other examples, LIDAR data, radar data, or other data may also be processed as described herein.

FIG. 2 illustrates at 200 determining synthetic artifact image data, according to some implementations.

In one implementation, sample image data 170 may be obtained that depicts artifact image data 202. The artifact image data 202 comprises an image of an artifact, such as a model of a hand, that has been acquired. In some implementations, the artifact image data 202 may be acquired using the scanner 104. The artifact image data 202 may be processed using the decomposition module 156 to determine extracted data 158 representative of the features in the artifact image data 202. This extracted data 158 may be processed to determine parameters 160.

In another implementation, the artifact image data 202 may be omitted and parameters 160 may be manually determined to produce the synthetic artifact image data 204.

Source image data 140 is processed to determine extracted data 158 representative of the features in the source image data 140. The extracted data 158 from the source image data 140 may be processed by the composition module 162 using the parameters 160 to produce the synthetic artifact image data 204. For example, artifacts such as fake hands may omit some details that are depicted in source image data 140.

The synthetic artifact image data 204 may then be included in the enhanced image data 182 and used as training data 180 for training the machine learning module 186. One or both of the source image data 140 or the sample image data 170 may comprise first modality image data 114 and second modality image data 116.

FIG. 3 is a block diagram 300 of an image enhancement module 150 determining synthetic artifact image data 204, according to some implementations. Source image data 140 is provided to the image enhancement module 150.

The image enhancement module 150 may comprise a mask module 152. The mask module 152 may determine mask data 154. For example, the mask data 154 may delineate which portions of the source image data 140 are associated with a hand (foreground) or not a hand (background). The mask module 152 may determine the mask data 154 using one or more techniques, such as thresholding, a trained machine learning system, and so forth.

The image enhancement module 150 may comprise the decomposition module 156. The decomposition module 156 determines a plurality of instances of extracted data 158. Each instance of extracted data 158 may represent one or more features of the input that have a specific frequency or are within a particular frequency range. In one implementation, the decomposition module 156 may utilize a Laplacian pyramid to determine the extracted data 158, with the extracted data 158 comprising the output from the Laplacian pyramid that corresponds to a particular level of the pyramid.

In some implementations, two or more frequency ranges of the extracted data 158 may be mutually exclusive or may overlap. For example, a first frequency range extends from a first frequency to a second frequency, a second frequency range extends from a third frequency to a fourth frequency, and the third frequency and the fourth frequency are greater than the second frequency. In another example, a first frequency range extends from a first frequency to a second frequency, a second frequency range extends from a third frequency to a fourth frequency, and the third frequency is greater than the second frequency. As a result, a portion of the first frequency range and the second frequency range may overlap.

A parameter module 302 may determine parameters 160. In one implementation, the parameter module 302 may utilize user input to specify the parameters 160. In another implementation, the parameter module 302 may comprise a machine learning system that has been trained to determine the parameters 160. In some implementations, the parameters 160 may specify a value for each level of the Laplacian pyramid. For example, if the decomposition module 156 uses a Laplacian pyramid with five levels and provides as output extracted data 158(1)-(5), the parameters 160 may comprise five values.

In one implementation, the values may be considered to represent the relative weight or importance that is given to the information in a particular instance of the extracted data 158. For example, if the first parameter value associated with the first extracted data 158(1) associated with the first level is greater than 1, this information may be emphasized in the resulting output. Continuing the example, if the first parameter value is less than 1, this information may be deemphasized in the resulting output.

The composition module 162 may accept as input the extracted data 158 that is associated with the source image data 140 and the parameters 160 and provides modified data 322 as output. For example, the composition module 162 may multiply each instance of extracted data 158 with a corresponding value from the parameters 160 to produce the modified data 322.

In the implementation depicted here, to determine synthetic artifact image data 204, one or more of the values of the parameters 160 may be less than one, resulting in a reduction or elimination of some of the features presented in the source image data 140. As a result, the modified data 322 may contain less information than the source image data 140.

In some implementations, the modified data 322 may be provided to a background module 324. The background module 324 may use as input the source image data 140, the mask data 154, and the modified data 322. The background module 324 may produce the synthetic artifact image data 204 by using the mask data 154 to extract the background of the source image data 140 and the foreground data from the modified data 322. The resulting synthetic artifact image data 204 may thus present the background as depicted in the source image data 140 and the modified data 322.

In some implementations, the background module 324 may apply one or more of a smooth, blur, or other function with respect to at least a border between the foreground and the background as indicated by the mask data 154. This reduces the abrupt transition and improves the fidelity of the image with respect to an actual image.

The operation of the composition module 162 may result in a reduction or elimination of some noise that typically is present, such as in the operation of the camera 108 of the scanner 104. To improve the fidelity of the output, the modified data 322 or an image based thereon, such as output from the background module 324, may be processed using a noise module 326. The noise module 326 creates noise data that is added to the modified data 322. For example, the noise module 326 may add noise that is characterized by one or more of a Gaussian, Poisson, salt and pepper, speckle, and so forth. The output from the noise module 326 comprises the synthetic artifact image data 204, that appears to depict an artifact with noise.

In some implementations, the order of operation may be changed, with the noise module 326 operating on the modified data 322, and the output being provided to the background module 324.

One implementation is shown in the following pseudo-code:

```
def hand_replica_augmentation(original_img):
    #Laplacian Pyramid Decomposition
    num_pyramid_levels=5
    gaussian_pyramid, laplacian_pyramid=generate_pyramid
        (original_img, num_pyramid_levels)
    #Weighted Fusion
    modified_img=[None for i in range(num_pyramid_lev-
        els)]
    weights=[1, 0.9, 0.1, 0.1, 0.1]
```

```
for i in [num_pyramid_levels-1, . . . , 0]:
    modified_img[i]=weights[i]*laplacian_pyramid[i])+
        Upsample and Blur(gaussian pyramid[i+1])
#Mask Generation
fg_bg_threshold=
    min(original_img)+(max(original_img)-min(original
        img))*0.25
mask=original_img>fg_bg_threshold
#Alpha blending of original and modified crops using
    fg_bg mask
alpha_blended_image=mask*modified img[0]+(1-mask)
    *original_img
#Random noise addition
noise_type=get_random_noise_type_weighted
    ([('salt_and_pepper', 0.2),('gaussian', 0.2), ('poisson',
        0.1), ('none', 0.5)])
noise=get_noise(noise_type)
synthetic_hand_replica_image=alpha_blended_image+
    noise return synthetic_hand_replica_image
Code Example 2
```

In other implementations, the order of processing may be varied, operations may be omitted, and so forth. In one implementation, the mask data 154 may be used by one or more of the decomposition module 156, the composition module 162, the noise module 326, and so forth. For example, the decomposition module 156 may process to decompose the portion of the source image data 140 that is indicated by the mask data 154 as containing the object of interest, such as the foreground showing the hand. In another implementation, the background module 324 may be omitted. In yet another implementation, the composition module 162 may include a noise function such that the modified data 322 includes noise.

FIG. 4 illustrates at 400 determining augmented image data, according to some implementations. Sample image data 170 is processed. For example, the sample image data 170 may comprise dirty image data 402 depicting a dirty hand.

The sample image data 170 is processed using the decomposition module 156 to determine extracted data 158 that represents features present in the dirty image data 402. At least some instances of this extracted data 158 is representative of features such as dirt, while other instances of extracted data 158 are representative of overall hand shape, fine details such as creases and veins, and so forth.

The source image data 140 is processed using the decomposition module 156 to determine extracted data 158. The composition module 162 then blends the extracted data 158 from the source image data 140 and the sample image data 170 using one or more parameters 160 to determine augmented image data 404. For example, as shown here the augmented image data 404 depicts the source image with the dirt from the dirty image data 402. In some implementations an alpha blending algorithm may be used to perform the blend.

The augmented image data 404 may then be included in the enhanced image data 182 and used as training data 180 for training the machine learning module 186. One or both of the source image data 140 or the sample image data 170 may comprise first modality image data 114 and second modality image data 116.

Figure 5:
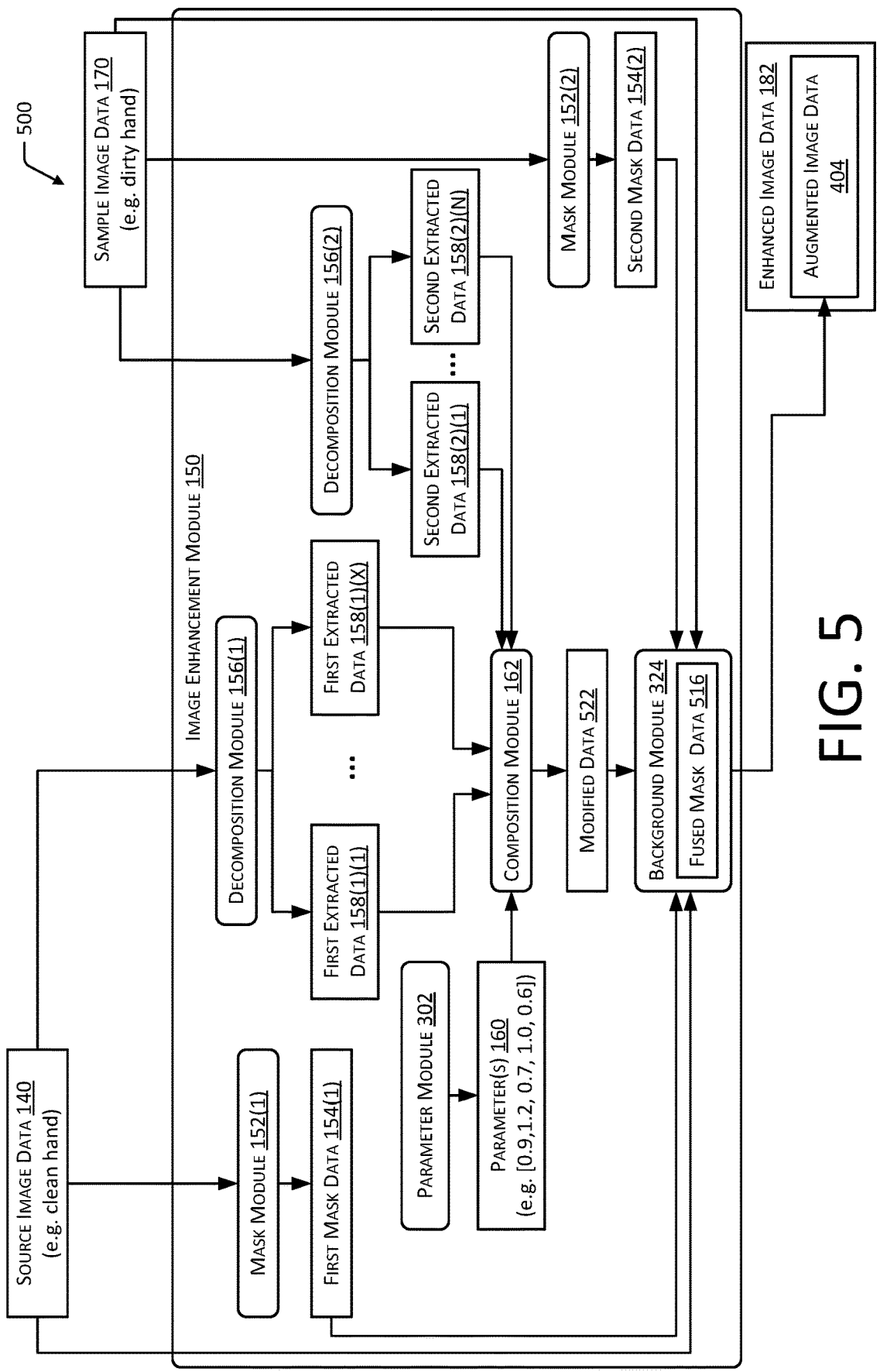
FIG. 5 is a block diagram of determining augmented image data, according to some implementations.

FIG. 5 is a block diagram 500 of the image enhancement module 150 determining augmented image data 404, according to some implementations.

Source image data 140 and sample image data 170 are provided to the image enhancement module 150.

The image enhancement module 150 may comprise a first mask module 152(1). The first mask module 152(1) may determine first mask data 154(1). For example, the first mask data 154(1) may delineate which portions of the source image data 140 are associated with a hand (foreground) or not a hand (background). The first mask module 152(1) may determine the first mask data 154(1) using one or more techniques, such as thresholding, a trained machine learning system, and so forth.

The image enhancement module 150 may comprise a second mask module 152(2). The second mask module 152(2) may determine second mask data 154(2). For example, the second mask data 154(2) may delineate which portions of the sample image data 170 are associated with a hand (foreground) or not a hand (background). The second mask module 152(2) may determine the second mask data 154(2) using one or more techniques, such as thresholding, a trained machine learning system, and so forth.

The image enhancement module 150 may comprise a first decomposition module 156(1). The first decomposition module 156(1) determines a plurality of instances of first extracted data 158(1)(1)-158(1)(X). Each instance of first extracted data 158(1)(X) may represent one or more features of the input that have a specified frequency or are within a particular frequency range. In one implementation, the first decomposition module 156(1) may utilize a Laplacian pyramid to determine the first extracted data 158(1)(X), with the first extracted data 158(1)(X) comprising the output from the Laplacian pyramid that corresponds to a particular level of the pyramid.

The image enhancement module 150 may comprise a second decomposition module 156(2). The second decomposition module 156(2) determines a plurality of instances of second extracted data 158(2)(1)-158(2)(N). Each instance of second extracted data 158(2)(N) may represent one or more features of the input that have a specific frequency or are within a particular frequency range. In one implementation, the second decomposition module 156(2) may utilize a Laplacian pyramid to determine the second extracted data 158(2)(N), with the second extracted data 158(2)(N) comprising the output from the Laplacian pyramid that corresponds to a particular level of the pyramid.

The composition module 162 may accept as input the first extracted data 158(1)(1)-158(1)(X), at least a portion of the second extracted data 158(2)(1)-158(2)(N), and parameters 160 to determine modified data 522. The composition module 162 may use the parameters 160 to merge the first extracted data 158(1)(X) with at least a portion of the second extracted data 158(2)(N). For example, the composition module 162 may use an alpha blending algorithm to combine the first extracted data 158(1)(1)-158(1)(X), or a first image based thereon, and the second extracted data 158(2)(1)-158(2)(N), or a second image based thereon.

The image enhancement module 150 may include the background module 324. The background module 324 may use as input the source image data 140, the first mask data 154(1), the sample image data 170, the second mask data 154(2), and the modified data 522. The background module 324 may merge the first mask data 154(1) and the second mask data 154(2) to determine fused mask data 516. The background module 324 may use the fused mask data 516 may be used to extract the background of the source image data 140 and the foreground data from the modified data 522. In some implementations, the background module 324 may also use the sample image data 170 to determine the augmented image data 404. The resulting augmented image data 404 may thus present the background as depicted in the source image data 140 and the modified data 522 that appears to be shown as the hand of the source image data 140 with the features such as dirt that have been transferred from the sample image data 170.

In some implementations, the background module 324 may apply one or more of a smooth, blur, or other function to determine the fused mask data 516. This reduces the abrupt transition and improves the fidelity of the image with respect to an actual image. The use of the background module 324 and mask permits the transfer of features such as dirt that are within the foreground of the sample image data 170 to the foreground of the source image data 140, while avoiding transfer of features in the background.

One implementation is shown in the following pseudocode:

```
def dirt augmentation(clean img, dirt img):
    #Pyramid Decomposition
    num_pyramid_levels=5
    gaussian_pyramid clean,
        laplacian_pyramid_clean=generate pyramids(clean_img, num_pyramid_levels)
    gaussian_pyramid_dirt,
        laplacian_pyramid_dirt=generate_pyramids(dirt_img, num_pyramid_levels)
    #Clean Pyramid and Dirt Pyramid Fusion
    modified_img=[None for i in range(num_pyramid_levels)]
    weights=[2, 0, 2, 1, 0]
    for i in [num_pyramid_levels−1, . . . , 0]
        modified img[i]=(weights[i]*laplacian_pyramid dirt[i])+laplacian_pyramid_clean[i]+Upsample and Blur(gaussian_pyramid clean[i+1])
    #Mask Generation
    dirt threshold=min(dirt_img)+(max(dirt img)−min(dirt_img))*0.25
    clean_threshold=min(clean_img)+(max(clean img)−min (clean img))*0.25
    mask_dirt=dirt img>dirt_threshold
    mask clean=clean_img>clean threshold
    mask=mask clean*mask dirt
    mask=Blur(mask, filter size=31)
    #Alpha blending of original and modified crops using fg_bg mask
    alpha_blended_dirt_image=mask*modified img[0]+(1−mask)*clean_img
    return alpha_blended_dirt_image
```
Code Example 3

With respect to the Code Example 3, the parameters 160 as indicated by the weights in the pseudocode have values of {2, 0, 2, 1, 0} in which these values are ordered as {highest frequency band, high frequency band, middle frequency band, low frequency band, lowest frequency band}.

By varying the values of the parameters 160 it is possible to generate a variety of different augmented image data 404. In some implementations, the values may be varied within a range of values.

Figure 6:
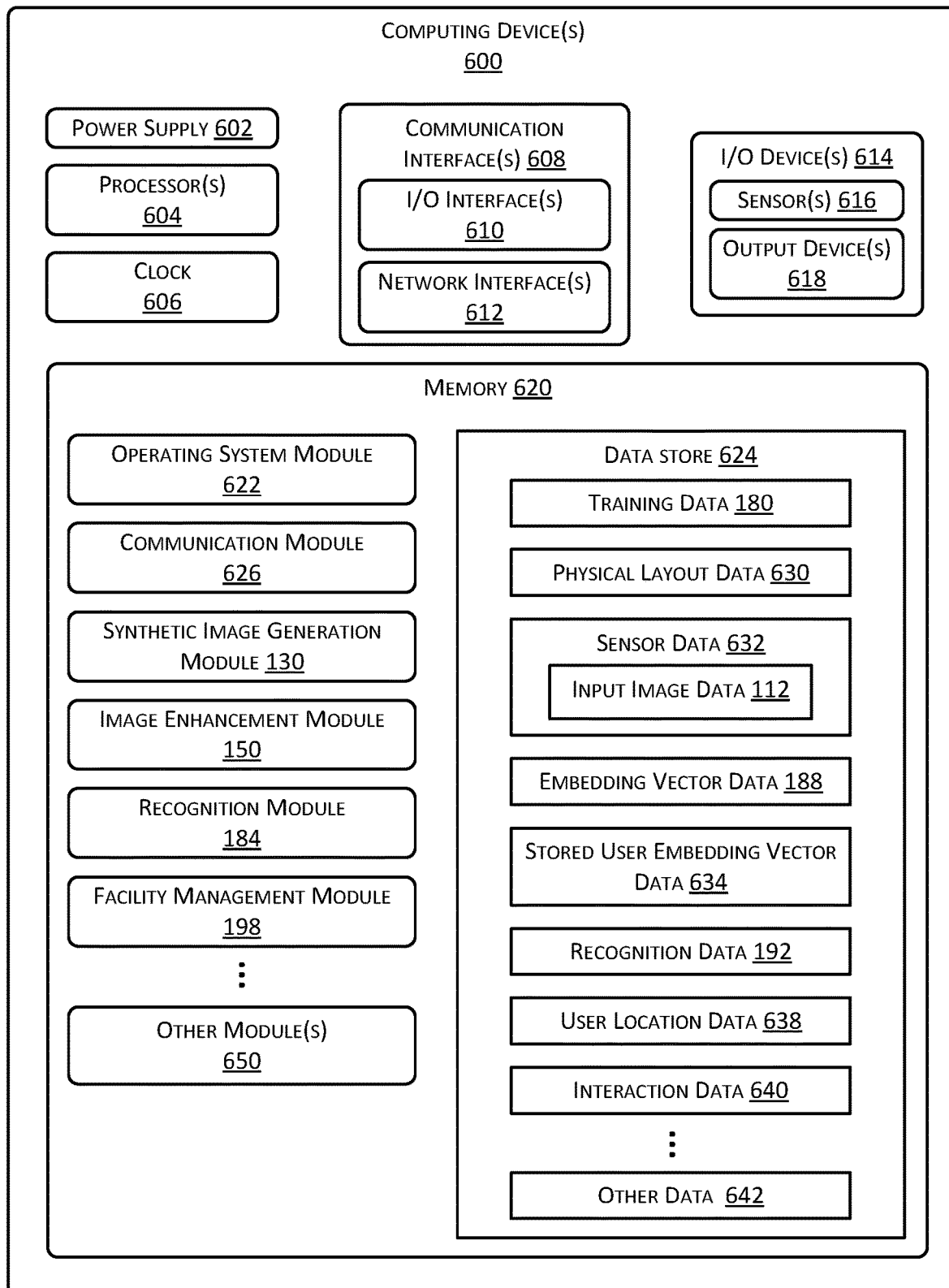
FIG. 6 is a block diagram of a computing device to determine training comprising enhanced image data, according to some implementations.

FIG. 6 is a block diagram of a computing device to determine training data 180 comprising enhanced image data 182 for training, according to some implementations.

The computing device 600 may be within the scanner 104, may comprise a server, and so forth. The computing device 600 may be physically present at the facility, may be accessible by a network, or a combination of both. The computing device 600 does not require end-user knowledge of the physical location and configuration of the system that delivers the services. Common expressions associated with the computing device 600 may include "embedded system", "on-demand computing", "software as a service (SaaS)", "platform computing", "network-accessible platform", "cloud services", "data centers", and so forth. Services provided by the computing device 600 may be distributed across one or more physical or virtual devices.

One or more power supplies 602 may be configured to provide electrical power suitable for operating the components in the computing device 600. The one or more power supplies 602 may comprise batteries, capacitors, fuel cells, photovoltaic cells, wireless power receivers, conductive couplings suitable for attachment to a power source such as provided by an electric utility, and so forth. The computing device 600 may include one or more hardware processors 604 (processors) configured to execute one or more stored instructions. The processors 604 may comprise one or more cores. One or more clocks 606 may provide information indicative of date, time, ticks, and so forth. For example, the processor 604 may use data from the clock 606 to associate a particular interaction with a particular point in time.

The computing device 600 may include one or more communication interfaces 608 such as input/output (I/O) interfaces 610, network interfaces 612, and so forth. The communication interfaces 608 enable the computing device 600, or components thereof, to communicate with other devices or components. The communication interfaces 608 may include one or more I/O interfaces 610. The I/O interfaces 610 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The i/O devices 614 may include input devices such as one or more of a sensor 616, keyboard, mouse, scanner, and so forth. The I/O devices 614 may also include output devices 618 such as one or more of a display device, printer, audio speakers, and so forth. In some embodiments, the i/O devices 614 may be physically incorporated with the computing device 600 or may be externally placed.

The network interfaces 612 may be configured to provide communications between the computing device 600 and other devices, such as carts, routers, access points, and so forth. The network interfaces 612 may include devices configured to couple to personal area networks (PANs), local area networks (LANs), wireless local area networks (WLANS), wide area networks (WANs), and so forth. For example, the network interfaces 612 may include devices compatible with Ethernet, Wi-Fi, Bluetooth, ZigBee, and so forth.

The computing device 600 may also include one or more buses or other internal communications hardware or software that allow for the transfer of data between the various modules and components of the computing device 600.

As shown in FIG. 6, the computing device 600 includes one or more memories 620. The memory 620 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 620 provides storage of computer-readable instructions, data structures, program modules, and other data for the operation of the computing device 600. A few example functional modules are shown stored in the memory 620, although the same functionality may alternatively be implemented in hardware, firmware, or as a system on a chip (SoC).

The memory 620 may include at least one operating system (OS) module 622. The OS module 622 is configured to manage hardware resource devices such as the I/O interfaces 610, the I/O devices 614, the communication interfaces 608, and provide various services to applications or modules executing on the processors 604. The OS module 622 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 620 may be a data store 624 and one or more of the following modules. These modules may be executed as foreground applications, background tasks, daemons, and so forth. The data store 624 may use a flat file, database, linked list, tree, executable code, script, or other data structure to store information. In some implementations, the data store 624 or a portion of the data store 624 may be distributed across one or more other devices including other computing devices 600, network attached storage devices, and so forth.

A communication module 626 may be configured to establish communications with one or more of the carts, sensors 616, display devices, other computing devices 600, or other devices. The communications may be authenticated, encrypted, and so forth.

The memory 620 may also store one or more of the synthetic image generation module 130, the image enhancement module 150, the recognition module 184, and so forth. The image enhancement module 150 may process the source image data 140 in batches, in real-time on demand, and so forth.

The memory 620 may store the facility management module 198. The facility management module 198 may perform various functions, such as tracking items between different inventory locations or to and from carts, generating restocking orders, directing operation of robots within the facility, using recognition data 192 to associate a particular user identity with a user in the facility, and so forth. During operation, the facility management module 198 may access sensor data 632 such as one or more of image data from cameras, weight data from weight sensors, and so forth. Information used by the image enhancement module 150 may be stored in the data store 624. For example, the data store 624 may be used to store the training data 180.

Information used by the facility management module 198 may be stored in the data store 624. For example, the data store 624 may be used to store physical layout data 630, sensor data 632, stored user embedding vector data 634, recognition data 192, user location data 638, interaction data 640, and so forth.

The physical layout data 630 may provide information indicative of where scanners 104, cameras, weight sensors, antennas for radio receivers, inventory locations, and so forth are within the facility with respect to one another. For example, the physical layout data 630 may comprise information representative of a map or floor plan of the facility with relative positions of gates with scanners 104 and inventory locations.

The sensor data 632 may comprise information obtained from one or more of the sensors 616 in or associated with the facility.

The stored user embedding vector data 634 may comprise vector data associated with particular user accounts. For example, the stored user embedding vector data 634 may comprise embedding vector data 188 that associates particular signatures of features with particular user accounts.

The facility management module 198 may generate the user location data 638 that is indicative of the location of the user within the facility. For example, the facility management module 198 may use image data obtained by the cameras to determine a location of the user. In other implementations, other techniques may be used for determining the user location data 638. For example, data from a smart floor may be used to determine the location of the user.

A user identity may be associated with user location data 638 based on the recognition data 192. For example, the user enters the facility and has their palm scanned, producing recognition data 192 that is indicative of their time of entry, a scanner 104 associated with where they entered, and their user identifier. The user location data 638 indicative of a path of a user that begins at the scanner 104 at the time of entry may be associated with the user identifier in the recognition data 192.

Based on the user location data 638 and the interaction data 640, a particular interaction may be associated with an account of a particular user. For example, if the user location data 638 indicates that the user is present in front of inventory location 492 at time 17:47:20 and the interaction data 640 indicates a pick of a quantity of one item from an area on inventory location 492 at 17:47:27, the user may be billed for that pick.

The facility management module 198 may use the sensor data 632 to generate the interaction data 640. The interaction data 640 may include information about the type of item involved, quantity involved, whether the interaction was a pick or place, and so forth. Interactions may include the user picking an item from an inventory location, placing an item at the inventory location, touching an item at the inventory location, rummaging through items at the inventory location, and so forth. For example, the facility management module 198 may generate interaction data 640 that indicates what item the user picked from a particular lane on a shelf, and then use this interaction data 640 to adjust the count of inventory stowed at that lane. The interaction data 640 may then be used to bill an account associated with the user identifier that is associated with the user who picked the item.

The facility management module 198 may process the sensor data 632 and generate output data. For example, based on the interaction data 640, a quantity of a type of item at a particular inventory location may drop below a threshold restocking level. The system may generate output data comprising a restocking order indicative of the inventory location, the area, and a quantity needed to replenish stock to a predetermined level. The restocking order may then be used to direct a robot to restock that inventory location.

Other modules 650 may also be present in the memory 620 as well as other data 642 in the data store 624. For example, a billing module may use the interaction data 640 and the recognition data 192 to bill an account associated with a particular user.

The devices and techniques described in this disclosure may be used in a variety of other settings. For example, the system may be used in conjunction with a point-of-sale (POS) device. The user may present their hand 102 to a scanner 104 to provide an indication of intent and authorization to pay with an account associated with the recognition data 192. In another example, a robot may incorporate a scanner 104. The robot may use the recognition data 192 to determine whether to deliver a parcel to the user, and based on the recognition data 192, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a memory, storing first computer-executable instructions; and
   one or more hardware processors to execute the first computer-executable instructions to:
   determine a first image;
   determine first extracted data indicative of at least a portion of one or more features of the first image that is within a first frequency range from a first frequency to a second frequency;
   determine second extracted data indicative of at least a portion of one or more features of the first image that is within a second frequency range from a third frequency to a fourth frequency, wherein the third frequency is greater than the second frequency;
   determine a first parameter and a second parameter;
   determine first modified data based on the first extracted data and the first parameter;
   determine second modified data based on the second extracted data and the second parameter;
   determine a second image, wherein the second image depicts a first feature;
   determine third extracted data indicative of one or more features of the second image that are within a third frequency range from a fifth frequency to a sixth frequency;
   determine fourth extracted data indicative of one or more features of the second image that are within a fourth frequency range from a seventh frequency to an eighth frequency, wherein the seventh frequency and the eighth frequency are greater than the sixth frequency;
   determine a third parameter and a fourth parameter;
   determine third modified data based on the third extracted data and the third parameter;
   determine fourth modified data based on the fourth extracted data and the fourth parameter;
   determine, based on the third modified data and the fourth modified data, a third image;
   determine, based on the first modified data and the second modified data and the third image, a fourth image; and
   train a first machine learning system using the fourth image.

2. The system of claim 1, wherein the first computer-executable instructions to determine the first extracted data and the second extracted data use a Laplacian pyramid, and further wherein the first extracted data is associated with a first level of the Laplacian pyramid and the second extracted data is associated with a second level of the Laplacian pyramid.

3. The system of claim 1, wherein a first value of the first parameter is greater than a second value of the second parameter.

4. The system of claim 1, wherein an object depicted in the first image is aligned to a specified orientation with respect to the first image.

5. The system of claim 1, the first computer-executable instructions to determine the fourth image further comprise instructions to:
   determine noise data, wherein the fourth image comprises the noise data.

6. The system of claim 1, the one or more hardware processors to further execute the first computer-executable instructions to:
   determine mask data indicative of an object depicted in the first image;
   determine background data based on the first image and the mask data; and
   determine foreground data based on the first modified data, the second modified data, and the mask data;
   wherein the fourth image comprises the background data and the foreground data.

7. The system of claim 6, the one or more hardware processors to further execute the first computer-executable instructions to determine noise data, wherein the foreground data further comprises the noise data.

8. The system of claim 1, wherein a first object depicted in the first image is aligned with a second object depicted in the second image.

9. The system of claim 1, wherein:
the first image represents an image depicting a clean hand, and
the second image represents an image depicting a dirty hand.

10. A method comprising:
determining a first image;
determining first extracted data indicative of one or more features of the first image that are within a first frequency range from a first frequency to a second frequency;
determining second extracted data indicative of one or more features of the first image that are within a second frequency range from a third frequency to a fourth frequency, wherein the third frequency is greater than the second frequency;
determining a first parameter and a second parameter;
determining first modified data based on the first extracted data and the first parameter;
determining second modified data based on the second extracted data and the second parameter;
determining a second image, wherein the second image depicts a first feature;
determining third extracted data indicative of one or more features of the second image that are within a third frequency range from a fifth frequency to a sixth frequency;
determining fourth extracted data indicative of one or more features of the second image that are within a fourth frequency range from a seventh frequency to an eighth frequency, wherein the seventh frequency and the eighth frequency are greater than the sixth frequency;
determining a third parameter and a fourth parameter;
determining third modified data based on the third extracted data and the third parameter;
determining fourth modified data based on the fourth extracted data and the fourth parameter;
determining, based on the third modified data and the fourth modified data, a third image;
generating, based on the first modified data and the second modified data and the third image, a fourth image, wherein the fourth image represents an enhancement of the first image; and
generating a set of training data comprising the fourth image.

11. The method of claim 10, the determining the first extracted data and the determining the second extracted data uses a Laplacian pyramid, wherein the first extracted data is associated with a first level of the Laplacian pyramid and the second extracted data is associated with a second level of the Laplacian pyramid.

12. The method of claim 10, wherein a first value of the first parameter is greater than a second value of the second parameter.

13. The method of claim 10, further comprising:
aligning an object depicted in the first image to a specified orientation with respect to the first image.

14. The method of claim 10, the generating the fourth image further comprising applying a noise function to the fourth image.

15. The method of claim 10, further comprising:
determining mask data indicative of an object depicted in the first image;
determining background data based on the first image and the mask data; and
determining foreground data based on the first modified data, the second modified data, and the mask data;
wherein the fourth image comprises the background data and the foreground data.

16. The method of claim 15, further comprising applying a noise function to the foreground data.

17. The method of claim 10, wherein a first object depicted in the first image is aligned with a second object depicted in the second image.

18. The method of claim 10, wherein:
the first image represents an image depicting a clean hand, and
the second image represents an image depicting a dirty hand.

19. A method comprising:
determining first data;
determining first extracted data indicative of one or more features of the first data that have at least a first frequency;
determining a first parameter;
determining first modified data based on the first extracted data and the first parameter;
determining second data;
determining second extracted data indicative of one or more features of the second data that have at least a second frequency;
determining a second parameter;
determining second modified data based on the second extracted data and the second parameter;
determining based on the second modified data, third data;
generating, based at least on the first modified data and the third data, fourth data, wherein the fourth data represents an enhancement of the first data; and
generating a set of training data comprising the fourth data.

20. The method of claim 17, wherein the first data and the fourth data comprise audio data.

* * * * *